United States Patent [19]

Lings et al.

[11] 4,171,184
[45] Oct. 16, 1979

[54] ROTOR BLADE FOR A GAS TURBINE ENGINE

[75] Inventors: Barry W. Lings, Spondon; Anthony G. Gale, Wollaton, both of England

[73] Assignee: Rolls-Royce Limited, London, England

[21] Appl. No.: 898,215

[22] Filed: Apr. 18, 1978

[30] Foreign Application Priority Data

May 5, 1977 [GB] United Kingdom ............... 18878/77

[51] Int. Cl.² ............................................. F01D 5/18
[52] U.S. Cl. ................................ 416/97 R; 416/96 A
[58] Field of Search ................................... 416/95–96, 416/97

[56] References Cited

U.S. PATENT DOCUMENTS

| 3,846,041 | 11/1974 | Albani | 416/96 A |
| 3,966,357 | 6/1976 | Corsmeier | 416/96 A X |
| 3,973,874 | 8/1976 | Corsmeier et al. | 416/96 A X |
| 4,021,138 | 5/1977 | Scalzo et al. | 416/95 |
| 4,035,102 | 7/1977 | Maghon | 416/95 |

Primary Examiner—Everette A. Powell, Jr.
Attorney, Agent, or Firm—Cushman, Darby & Cushman

[57] ABSTRACT

A gas turbine rotor blade has a root portion and a hollow aerofoil supported from the root. Within the hollow aerofoil is mounted an air entry tube which has a closed end at or adjacent the tip of the aerofoil, the tube being sealed to the hollow blade interior at or adjacent the closed end so as to close off the otherwise open tip of the hollow aerofoil.

4 Claims, 4 Drawing Figures

U.S. Patent  Oct. 16, 1979  4,171,184
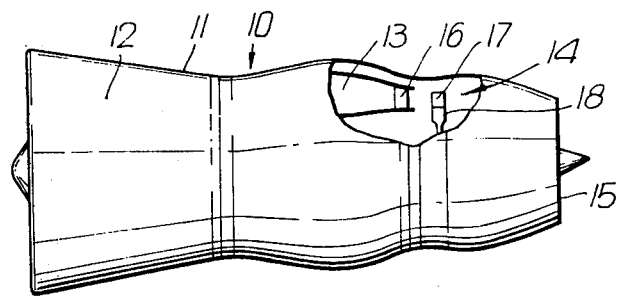
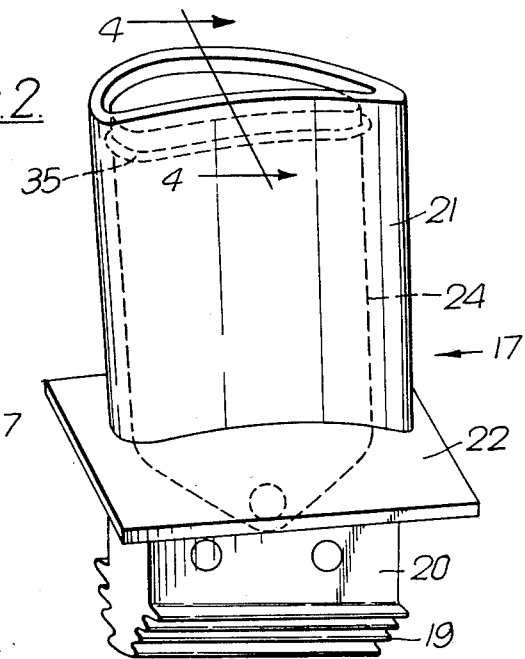
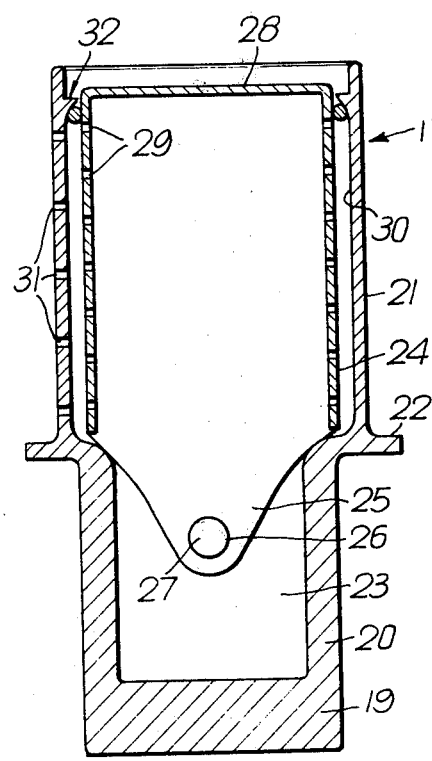
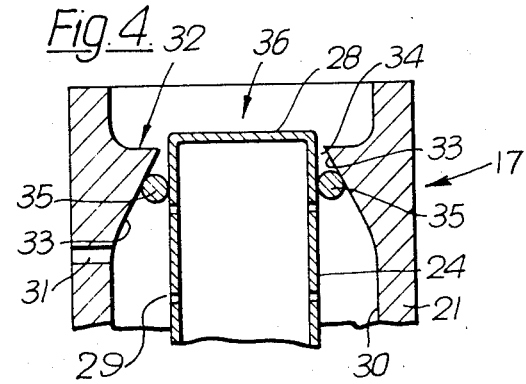

ROTOR BLADE FOR A GAS TURBINE ENGINE

This invention relates to a rotor blade for a gas turbine engine.

In modern gas turbine engines, it is frequently the practice to make at least some of the turbine rotor blades hollow, and to provide them with air cooling systems within their hollow interiors. One such air cooling system involves the use of an apertured air guide tube or entry tube mounted within the hollow blade interior and arranged to direct cooling air from its interior onto the inner surfaces of the hollow blade.

Previously it has been thought necessary to ensure that the hollow blade has a closed tip to retain the tube, or simply to seal off the hollow blade interior. However, we have invented a construction in which the hollow blade may be left with an open tip.

According to the present invention, a rotor blade for a gas turbine engine comprises a root portion adapted to support a hollow aerofoil, and an air entry tube mounted within the hollow interior of the aerofoil, the air entry tube having a closed end at or adjacent the tip of the aerofoil remote from the root, and being sealed to the hollow blade interior at or adjacent said closed end to seal off the otherwise open tip of the hollow aerofoil.

Preferably the seal comprises a rib extending from the hollow blade interior towards the tube, the rib and tube cooperating to form a gap which tapers toward the tip of the aerofoil, and a sealing member mounted in the gap so that centrifugal loads on the member will cause it to seal in the tapered gap.

Preferably the sealing member is a malleable wire.

It may be desirable to allow the aerofoil to extend for a short distance beyond the closed end of the tube, to form a well or cavity at the tip of the blade.

The invention will now be particularly described merely by way of example, with reference to the accompanying drawings in which:

FIG. 1 is a partly broken away view of a gas turbine engine having rotor blades in acordance with the invention, FIG. 2 is an enlarged perspective view of one of the rotor blades of the engine of FIG. 1 and in accordance with the invention, FIG. 3 is a section through the blade of FIG. 2 on its mid-chord line, and FIG. 4 is a further enlarged section of the tip of the blade on the line 4—4 in FIG. 2.

In FIG. 1 there is shown a gas turbine engine 10 having a casing 11 within which are mounted in flow series, a compressor 12, combustion section 13 and turbine 14. Overall operation of the engine is conventional in that the compressor 12 takes in and compresses air which then flows into the combustion section 13. It is then mixed with fuel and the resulting mixture burnt. The hot gases thus produced drive the turbine 14 which is connected to the compressor 12 to drive it. The spent gases then flow through a propulsion nozzle 15 to produce propulsive thrust.

The turbine 14 comprises, in more detail, guide vanes 16 which direct the hot gases from the combustion section 13 on to the turbine rotor blades 17 which are mounted from a turbine disc 18. The detailed construction of the rotor blades 17 in accordance with the invention is amplified below with reference to FIGS. 2-4 of the drawings.

As can best be seen from FIG. 2, each blade 17 comprises a root 19 which supports, by way of a shank 20, a hollow aerofoil 21. At the root end of the aerofoil portion 21 there extends a platform member 22 which forms part of the surface defining the inner boundary of flow of gas through the turbine. The root 19 is of conventional form, that depicted being of the 'firtree' type, and it is shaped to engage with a correspondingly shaped slot in the periphery of the blade carrying disc 18. In this way the blade is retained to the disc. Because the blades operate in an environment of very hot gas, they are provided with air cooling, the necessary air being bled from the airflow through the compressor. In the present case this cooling air is arranged to be fed to the side face of the shank 20 where it enters a passage 23 which extends along the shank and feeds the air into the interior of a fabricated sheet metal air guide tube 24.

The tube 24 comprises a substantially aerofoil section apertured tube supported from the shank 20 by a pair of ears 25 which extend into the shank 20, and a drilling 26 through the shank 20 and ears 25 through which passes a pin 27 to retain the tube 24. If necessary the ears 25 may be thickened or otherwise strengthened to take the pin loads. At its other extremity the tube is closed by a cap 28, which may be cast integral with the tube or may be a separate piece welded or brazed on, and the tube is arranged to seal to the interior of the blade adjacent the platform end of the aerofoil portion 21 so that it forms a chamber from which cooling air may only escape through the plurality of apertures 29 formed in its wall.

The tube 24 is of a section which echoes the shape of the interior surface 30 of the aerofoil portion 21, and it is dimensioned and located so that between the surface 30 and the tube there is a small gap whose size is arranged to suit the cooling requirements.

The cooling air flowing in the form of jets from the apertures 29 therefore impinges on the surface 30 providing impingement cooling of this surface. It then flows through a plurality of holes 31 to the outer surface of the blade, providing film cooling on this surface.

It will be appreciated that in order to operate efficiently, it is necessary that the hollow interior of the aerofoil portion 21 should be substantially sealed so as to prevent any substantial egress of air from the interior except through the film cooling holes 31. In the construction of the blade in accordance with the invention, the tip of the blade is left open, and the tube 24 is used to effect sealing of this open tip.

As can best be seen in FIG. 4, adjacent the tip of the tube 24 the inner surface 30 of the aerofoil portion 21 is provided with a rib 32 which projects toward the outer surface of the tube 24 so as to leave a small clearance between its extremity and the tube. The rib 32 is provided with an angled face 33 which is arranged to cooperate with the outer surface of the tube 24 to form a tapered gap 34, the section of the gap reducing in size toward the tip of the blade.

Within the gap 34 is located a sealing wire 35 made of a malleable metal. In FIGS. 3 and 4 this wire is only visible in section, but in FIG. 2, the wire 35 is shown in broken lines and it will be seen that it comprises a single wire bent to fit round the outer surface of the tube. It may be preferably however to make this wire in two or more portions.

When the engine 10 is operating therefore, centrifugal forces acting on the wire 35 will force it radially outwards into the tapering gap 34, thus providing a good seal between the tip portion of the outer surface of the tube 24 and the rib 32 and hence the inner surface 30 of the aerofoil portion 21. This together with the cap 28 effectively seals off the open end of the hollow aerofoil portion, and the engagement between the wire 35 and the tube 24 will also provide frictional damping of vibrational movement of the tube within the blade and consequently reduce the risk of fretting.

It will be noted that the tube 24 and aerofoil portion 21 are so dimensioned that the aerofoil portion 21 wall projects beyond the engagement between the rib 32 and the tube 24 to form a cavity or well 36 in the tip of the aerofoil portion 21 defined by the projecting side walls of the aerofoil and the cap 28. This well 36 has aerodynamic advantages and also allows the possibility of the tip of the blade rubbing against static structure and wearing away some of the wall without substantial detriment to the operation of the blade.

Using the construction described above allows certain advantages to be gained. Thus the open tip of the blade allows the tube 24 to be assembled into the aerofoil portion 21 from the tip, and this avoids the necessity of making large holes in the highly stressed root or forming the blade in two sections so that the tube can be introduced. The lack of a separate closure for the tip of the aerofoil portion 21 also represents a saving in weight and makes it easy to provide the well 36, and the easily introduced sealing wire 35 gives a good seal and damps the tube 24.

It should be noted that the embodiment described above could be altered in various respects if desired. Thus as mentioned, the sealing wire could be made a plurality of sections, and if necessary the rib 32 and its surface 33 could be made smaller or deleted, a similar feature being formed on the outside of the tube 24 which could cooperate with the inner surface of the aerofoil portion 21 to form the tapered groove.

It would also be possible to locate the tube 24 in the blade by a variety of means other than the pin-fixing described above; thus a purely metallurgical joint or other mechanical lock could be used.

We claim:

1. A rotor blade for a gas turbine engine comprising:
a root portion;
a hollow aerofoil portion supported from said root portion and having an outer open end;
an air entry tube having at least one closed end, said air entry tube being inserted through the open end of said aerofoil portion and mounted within the hollow interior thereof with its closed end positioned adjacent the outer open end of said aerofoil portion;
securing means for mounting said air entry tube within the hollow interior of said aerofoil portion;
means defining a tapering gap between the hollow interior of said aerofoil portion and the outside surface of said air entry tube, said tapering gap reducing in size toward the tip of the blade and being positioned adjacent the outer open end of said aerofoil portion and the closed end of said air entry tube;
and sealing and dampening means cooperating with said tapering gap to seal the air entry tube to the hollow interior of said aerofoil portion and to close off the open end of said aerofoil portion adjacent the closed end of said air entry tube, said sealing and dampening means including a malleable wire bent to a shape closely conforming with said air entry tube's exterior and with the hollow interior of said aerofoil portion, said malleable wire being forced into said gap by centrifugal forces on said blade when said blade is in operation.

2. A rotor blade as claimed in claim 1 and in which said hollow aerofoil portion extends beyond the closed end of said air entry tube to form a well or cavity at the tip of the blade.

3. A rotor blade as claimed in claim 1 in which said means defining said tapering gap is a rib extending from a surface of at least one of the hollow interior of said aerofoil portion and the exterior of said air entry tube.

4. A rotor blade as claimed in claim 3 in which said rib extends from said hollow interior of said aerofoil portion.